(12) United States Patent
Yamada (10) Patent No.: US 11,489,226 B2
(45) Date of Patent: Nov. 1, 2022

(54) BATTERY PACK FOR ELECTRIC WORK VEHICLE

(71) Applicant: Kubota Corporation, Osaka (JP)

(72) Inventor: Masahiro Yamada, Sakai (JP)

(73) Assignee: Kubota Corporation, Osaka (JP)

( * ) Notice: Subject to any disclaimer, the term of this patent is extended or adjusted under 35 U.S.C. 154(b) by 393 days.

(21) Appl. No.: 16/842,269

(22) Filed: Apr. 7, 2020

(65) Prior Publication Data

US 2020/0365854 A1 Nov. 19, 2020

(30) Foreign Application Priority Data

May 14, 2019 (JP) .............................. JP2019-091388

(51) Int. Cl.
*H02J 7/00* (2006.01)
*H01M 50/20* (2021.01)
*B60L 50/64* (2019.01)
*B60L 53/80* (2019.01)
*B60K 1/04* (2019.01)

(52) U.S. Cl.
CPC ............... *H01M 50/20* (2021.01); *B60K 1/04* (2013.01); *B60L 50/64* (2019.02); *B60L 53/80* (2019.02); *B60K 2001/0416* (2013.01); *B60K 2001/0477* (2013.01); *B60K 2001/0494* (2013.01); *B60L 2200/40* (2013.01); *B60Y 2200/223* (2013.01); *H01M 2220/20* (2013.01)

(58) Field of Classification Search
CPC ... H01M 50/20; H01M 2220/20; B60L 50/64; B60L 53/80; B60L 2200/40; B60K 2001/0416; B60K 2001/0477; B60K 2001/0494; B60K 1/04; B60Y 2200/223

USPC .................................... 320/109, 112; 701/22
See application file for complete search history.

(56) References Cited

U.S. PATENT DOCUMENTS

| | | | |
|---|---|---|---|
| 2010/0136425 A1* | 6/2010 | Gau ........................ | B60L 53/80 429/187 |
| 2014/0102065 A1 | 4/2014 | Moriguchi et al. | |
| 2018/0338416 A1* | 11/2018 | Uemura ............... | A01D 34/008 |
| 2019/0014718 A1* | 1/2019 | Uemura ................. | B60L 50/66 |
| 2019/0075724 A1* | 3/2019 | Becke ................. | H01M 10/488 |
| 2020/0254887 A1* | 8/2020 | Robert .................... | B60L 50/64 |

FOREIGN PATENT DOCUMENTS

| | | |
|---|---|---|
| JP | 4110270 A | 4/1992 |
| JP | 661647 U | 8/1994 |
| JP | 7215217 A | 8/1995 |
| JP | 2013115 A | 1/2013 |
| JP | 201613723 A | 1/2016 |
| JP | 201811574 A | 1/2018 |

* cited by examiner

*Primary Examiner* — Zixuan Zhou
(74) *Attorney, Agent, or Firm* — The Webb Law Firm (57) ABSTRACT

A battery pack for an electric work vehicle includes: a box-shaped housing; a transport wheel provided to the housing; a transport handle; a bracket fixed to the housing; a swing shaft for swingably connecting the transport handle and the bracket, between a vertical posture in which the transport handle extends upward from the housing and a horizontal posture in which the transport handle lies above the housing; and a vertical socket for receiving a base end part of the transport handle of the vertical posture to resist a torque of the transport handle caused during an operation.

5 Claims, 7 Drawing Sheets

BATTERY PACK FOR ELECTRIC WORK VEHICLE

CROSS-REFERENCE TO RELATED APPLICATION

This application claims priority to Japanese Patent Application No. 2019-091388 filed May 14, 2019, the disclosure of which is hereby incorporated by reference in its entirety.

BACKGROUND OF THE INVENTION

Field of the Invention

An electric work vehicle, for example, one disclosed in Japanese Unexamined Patent Application Publication No. 2018-11574, has a battery pack and a battery housing part which can accommodate the battery pack, and the battery pack is configured to be installed and removed in and from the battery housing part. The battery pack is a heavy object having a capacity to allow a long-hours mowing work. In order for a worker to easily move the battery pack, a pair of right and left wheels are provided to the battery pack. When the battery pack is loaded from the ground to the battery housing part, and when the battery pack is unloaded from the battery housing part to the ground, the worker vertically swings the battery pack about the wheels. For improving the usability by the user during such loading and unloading to and from the battery housing part, the battery pack is provided with a handle. When the battery pack is to be used, this handle is slid vertically above the battery pack, and when the battery is not in use, the handle can be slid downward to be retracted to a height level of the battery pack.

In the battery pack shown in Japanese Unexamined Patent Application Publication No. 2018-11574, there is provided a slide guiding mechanism for sliding the handle in upward and downward directions. The structure of the battery pack provided with such a slide guiding mechanism is complex, while the structure of a swing-type handle which is swingable between a vertical posture and a horizontal posture is simple as compared with the slide-type handle. Even so, with the structure of the swing-type handle, a large torque (load) acts on a swing shaft of the handle when the handle is swung to the vertical posture. Accordingly, it is necessary to make the swing shaft large, and thus a base part of the handle becomes large. In view of the above circumstance, the objective of the present invention is to provide a battery pack for an electric work vehicle which adopts a swing-type handle with a simple structure, and at the same time, adopts a handle which can bear a load during the operation.

SUMMARY OF THE INVENTION

A battery pack for an electric work vehicle according to one embodiment of the present invention, which battery pack is installed and removed in and from a battery housing part provided in a vehicle body, includes:
a box-shaped housing;
a transport wheel provided to the housing;
a transport handle;
a bracket fixed to the housing;
a swing shaft for swingably connecting the transport handle and the bracket, between a vertical posture in which the transport handle extends upward from the housing and a horizontal posture in which the transport handle lies above the housing; and
a vertical socket for receiving a base end part of the transport handle in the vertical posture to resist a torque of the transport handle caused during an operation.

According to this configuration, when the battery pack is to be moved, the transport handle is swung to the vertical posture, and the base end part of the transport handle enters the vertical socket. When the transport handle is operated under a principle of leverage, since the base end part is surrounded by the vertical socket, a torque caused in the base end part hardly acts on the swing shaft, and is received by a wider surface area of the vertical socket. Accordingly, a diameter of the swing shaft can be made small. In addition, when the transport handle is in the vertical posture, the transport handle is accommodated in the vertical socket, and thus the transport handle in the vertical posture is stable.

In one preferred embodiment of the battery pack for the electric work vehicle according to the present invention, the battery pack further includes:
a horizontal socket for receiving the base end part of the transport handle in the horizontal posture.

When the transport handle is swung to the horizontal posture, the base end part of the transport handle is received by the horizontal socket. With this, the transport handle in the horizontal posture becomes stable.

In one preferred embodiment of the battery pack for the electric work vehicle according to the present invention,
the vertical socket and the horizontal socket are integrally formed in the bracket.

With this, the structure of the vertical socket and the horizontal socket can be simplified as compared with a case where they are formed separately from the bracket.

In one preferred embodiment of the battery pack for the electric work vehicle according to the present invention,
the bracket has a vertical slot formed therein through which the swing shaft penetrates,
when the transport handle is in the vertical posture, the swing shaft is positioned in a lower portion of the vertical slot, and when the transport handle is in the horizontal posture, the swing shaft is positioned in an upper portion of the vertical slot, and
the transport handle in the horizontal posture is detached from the vertical socket, and the transport handle in the vertical posture is detached from the horizontal socket.

With this configuration, when the posture of the transport handle is shifted between the vertical posture and the horizontal posture, the position of the swing shaft is also shifted. Accordingly, when the transport handle is shifted from the vertical posture to the horizontal posture, the transport handle is detached from the vertical socket, and when the transport handle is shifted from the horizontal posture to the vertical posture, the transport handle is detached from the horizontal socket. During the shifting of the posture of the transport handle between the vertical posture and the horizontal posture, the transport handle is guided by the vertical socket and the horizontal socket, and thus the posture is changed smoothly.

In one preferred embodiment of the battery pack for the electric work vehicle according to the present invention, the battery pack further includes:
a lock mechanism for locking the transport handle at the vertical posture and at the horizontal posture.

When the transport handle is in the vertical posture, the transport handle is placed in the vertical socket, while the transport handle is in the horizontal posture, the transport handle is placed in the horizontal socket. However, in order for the transport handle to be held firmly in each socket, it is preferable that a lock mechanism is provided.

In a case where a lock mechanism is provided, in one preferred embodiment of the battery pack for the electric work vehicle according to the present invention, the lock mechanism includes a lock pin that penetrates the transport handle and the bracket.

Such a lock mechanism can be easily and cost-effectively realized, for example, by a lock pin that penetrates the transport handle and the bracket. With this configuration, the lock pin is inserted into the base end part of the transport handle, and a torque of the transport handle caused in the base end part acts on the vertical socket, and substantially no torque acts on the lock pin. Therefore, a lock pin having a smaller diameter can be used.

DETAILED DESCRIPTION OF THE PREFERRED EMBODIMENTS

Next, one embodiment of the electric work vehicle that has a battery pack of the present invention mounted thereon will be described with reference to the drawings. It is noted that, in the present specification, unless otherwise particularly noted, the terms "front", "frontward" and "forward" refer to a forward direction with respect to a front-rear direction (traveling direction) of the vehicle body, and the terms "rear", "rearward" and "backward" refer to a backward direction with respect to the front-rear direction (traveling direction) of the vehicle body. In addition, the right-left direction or lateral direction means a transverse direction of the vehicle body (vehicle body width direction) that is perpendicular to the front-rear direction of the vehicle body. The terms "upper" ("top") and "lower" ("bottom") indicate positional relation in the vertical direction (perpendicular direction) with respect to the vehicle body, and indicate relation in a height level above the ground.

Figure 1:
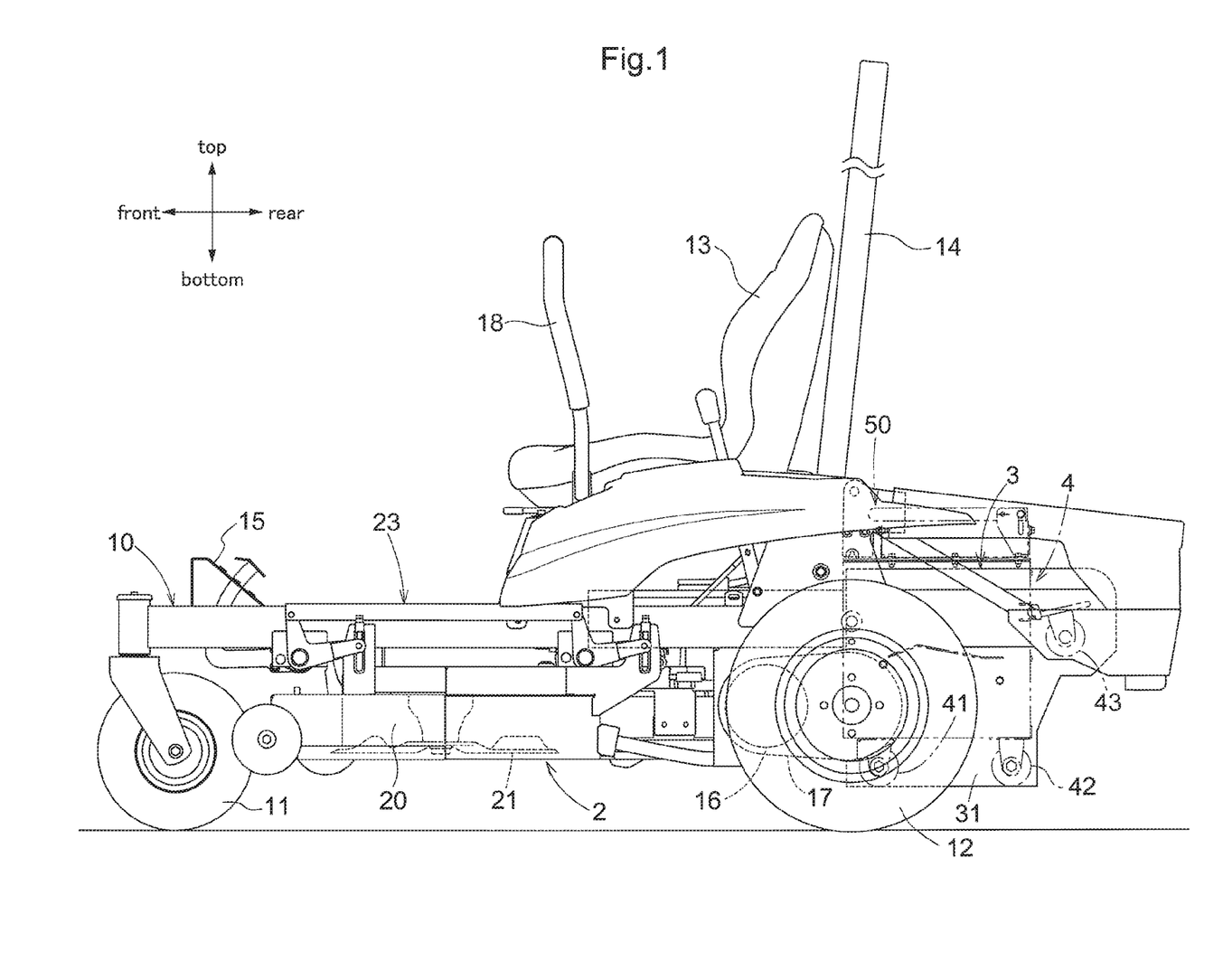
FIG. 1 is a left side view of an electric mower.
Figure 2:
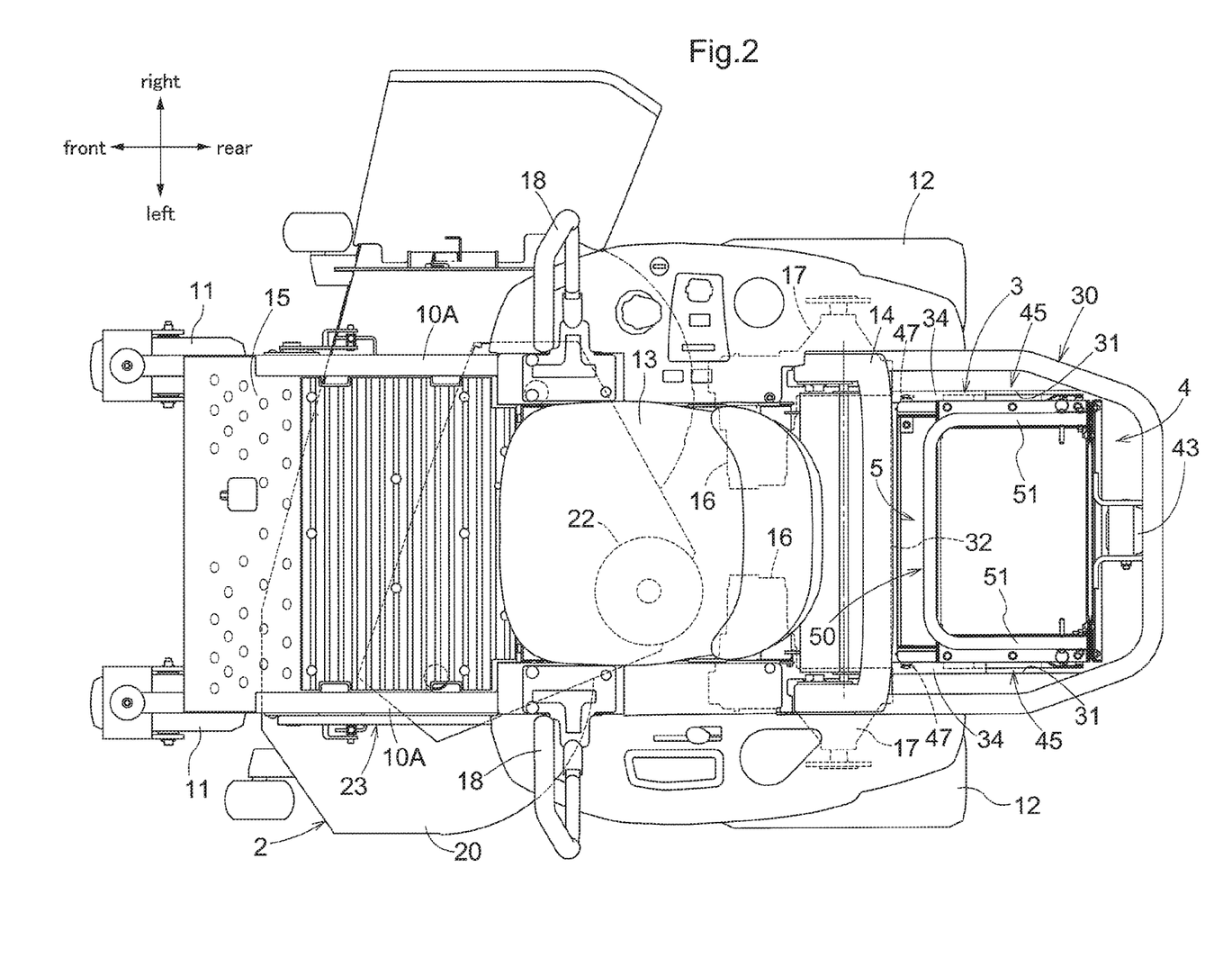
FIG. 2 is a plan view of the electric mower.

FIGS. 1 and 2 shows an electric mower as one example of the electric work vehicle. This electric mower includes a body frame 10 forming a vehicle body, a pair of right and left front wheels 11, a pair of right and left rear wheels 12, a mower unit 2, and a battery housing part 3. The body frame 10 is formed of plates, square pipes and the like assembled together. The mower unit 2 is provided between the front wheels 11 and the rear wheels 12 below a lower part of the body frame 10. The battery housing part 3 is provided between the left rear wheel 12 and the right rear wheel 12, in a rear part of the body frame 10. The rear wheels 12 are drive wheels and the front wheels 11 are freely rotatable caster wheels.

Above the body frame 10, there are disposed a driver's seat 13, a ROPS frame 14 and the like. The driver's seat 13 is supported by the body frame 10, and a lower part of the ROPS frame 14 is connected to the body frame 10. On the body frame 10 frontward of the driver's seat 13, a floor plate 15 is formed. The floor plate 15 serves as a foot rest for a driver.

In the rear part of the body frame 10, a pair of right and left running motors 16 and a pair of right and left deceleration mechanisms 17 are disposed. The power of the right running motor 16 is transmitted via the right deceleration mechanism 17 to the right rear wheel 12. The power of the left running motor 16 is transmitted via the left deceleration mechanism 17 to the left rear wheel 12.

On the right and left sides of the driver's seat 13, a pair of right and left shift levers 18 are disposed, respectively. By the driver's operation of the right shift lever 18 to a neutral position, the right running motor 16 is stopped. By the driver's operation of the right shift lever 18 to a forward movement side, the right running motor 16 is rotated to a forward movement side. By the driver's operation of the right shift lever 18 to a backward movement side, the right running motor 16 is rotated to a backward movement side. By the driver's operation of the left shift lever 18 to a neutral position, a forward movement side and a backward movement side, the left running motor 16 is actuated in a similar manner as above. With this, the running motors 16 are capable of driving the rear wheels 12 as travel wheels. In other words, as the driver operates each of the right and left shift levers 18 independently, each of the right and left rear wheels 12 is driven independently. The operation of the shift levers 18 realizes a straight traveling and a gyrating traveling at a desired vehicle speed.

The mower unit 2 is provided with a mower deck 20, two cutting blades 21, a cutting blade motor 22, and lifting link mechanism 23. The two cutting blades 21 are arranged side by side inside the mower deck 20, and rotated about respective vertical axes by the power of the cutting blade motor 22. The mower deck 20 is vertically movably suspended from the body frame 10 via the lifting link mechanism 23.

The battery housing part 3 for accommodating a battery pack 4 is provided to the rear part of the body frame 10. The battery pack 4 is a power source for the running motors 16 and the cutting blade motor 22.

Figure 3:
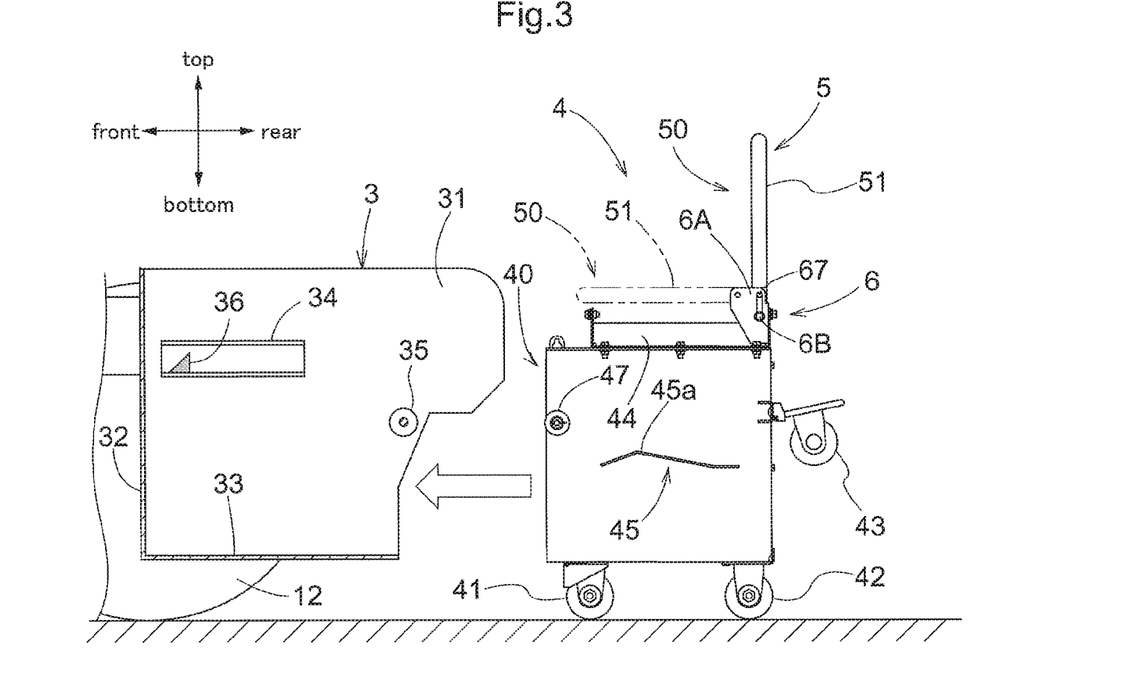
FIG. 3 is a side view showing a state before a battery pack is installed in a battery housing part.

As shown in FIG. 3, the battery housing part 3 includes a pair of right and left side walls 31, a front wall 32 and a floor plate 33. To each of the right and left side walls 31, a guide rail 34 and an auxiliary roller 35 are fixed. The guide rail 34 has a channel-shaped cross-section and extends in the front-rear direction. The auxiliary roller 35 is rotatably provided at a position somewhat rearward of a rear end of the guide rail 34. In the vicinity of a front end of the guide rail 34, a stopper 36 formed of an elastic body, such as spring and rubber, is provided inside the channel. The guide rail 34, the auxiliary roller 35 and the stopper 36 are used for guiding the battery pack 4 to a predetermined position in the battery housing part 3.

Next, the structure of the battery pack 4 will be described with reference to FIGS. 4 to 9. The battery pack 4 has a housing 40 in a shape of a box (specifically, rectangular parallelepiped shape). The housing 40 includes a front plate 40*f*, a rear plate 40*r*, a pair of right and left side plates 40*s*, a top panel 40*t* and a bottom plate 40*b*. The bottom plate 40*b* of the housing 40 is provided with a single front wheel 41 and a pair of right and left rear wheels 42, and the battery pack 4 is movable as a tricycle. The rear plate 40r is provided with an auxiliary wheel 43. The front wheel 41 and the rear wheel 42 function as transport wheels.

Figure 4:
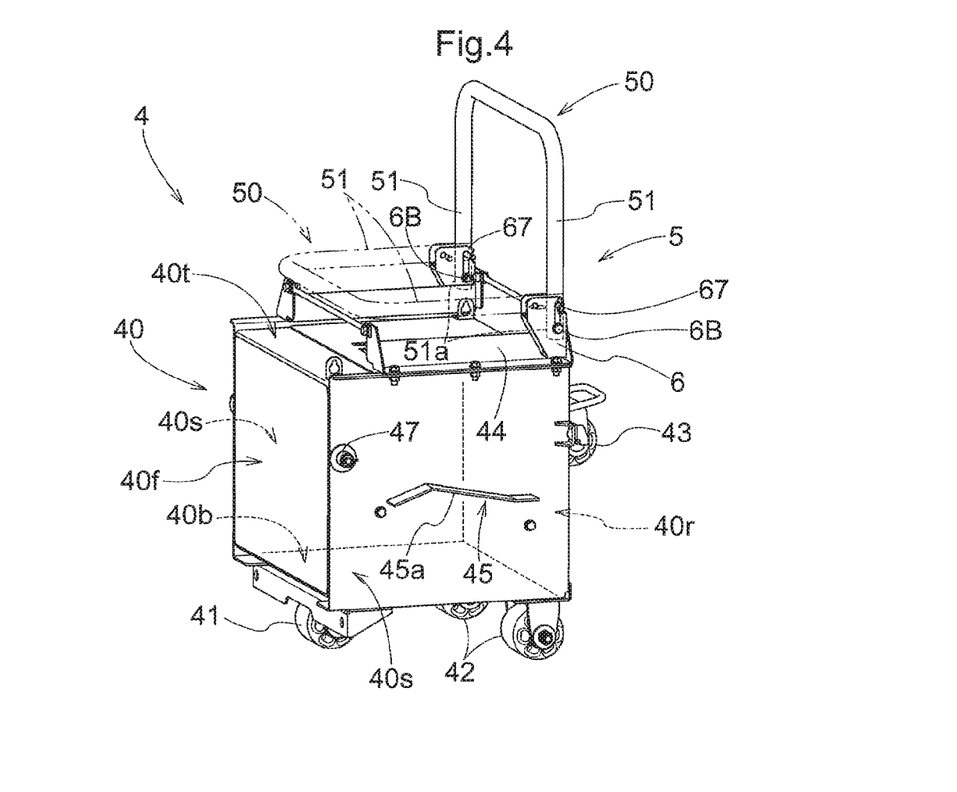
FIG. 4 is a perspective view of the battery pack.
Figure 5:
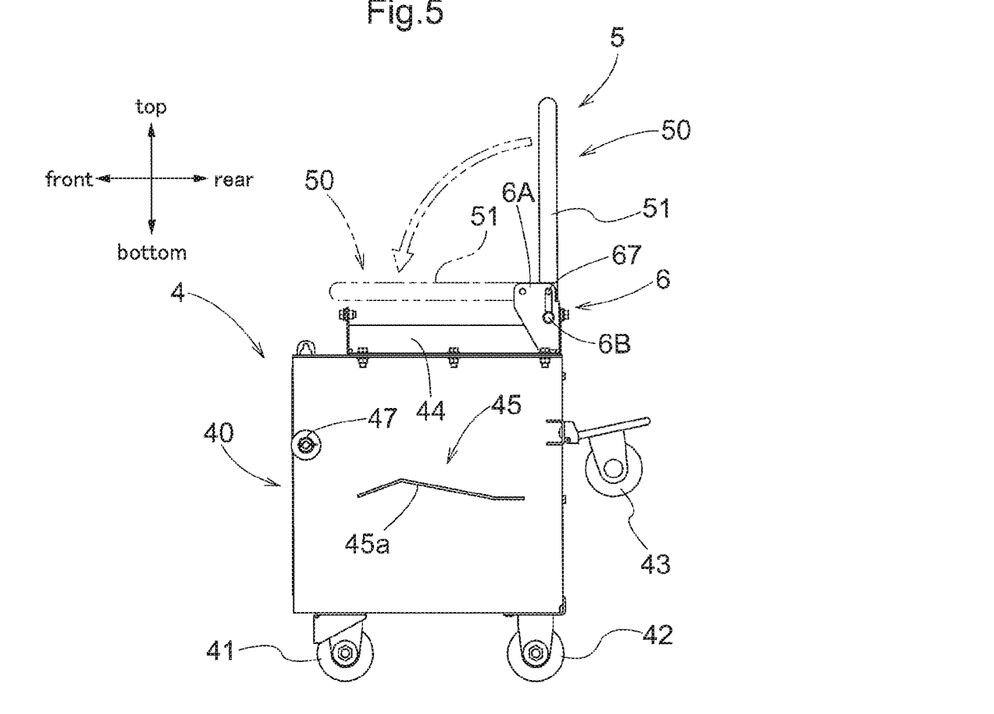
FIG. 5 is a side view of the battery pack.

Each of the pair of right and left side plates 40s is provided with a guide roller 47 and a guide plate 45. The guide plate 45 extends rearward from a position which is obliquely downward of the guide roller 47. In the present embodiment, the guide plate 45 includes a bent guide plate 45a having a guide face oriented downward.

Figure 9:
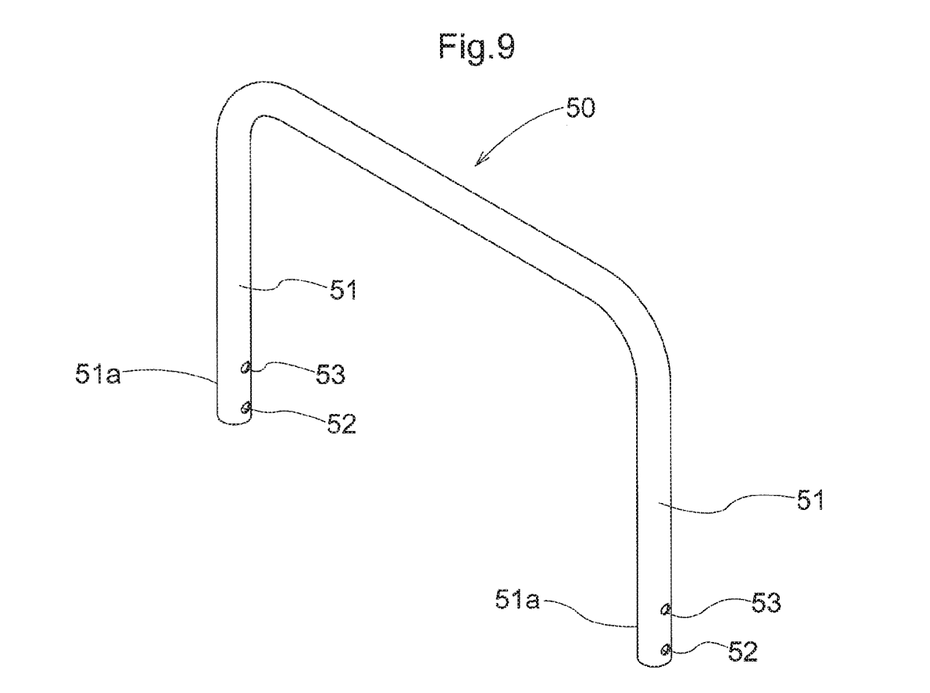
FIG. 9 is a perspective view of a transport handle.

To the top panel 40t, a handle assembly 5 is mounted via a pair of right and left frames 44. The handle assembly 5 includes a transport handle 50 and a swing mechanism 6. The swing mechanism 6 supports the transport handle 50 in such a manner that the transport handle 50 is swingable (nearly 90 degrees) between a vertical posture in which the transport handle 50 extends upward from the top panel 40t of the housing 40 (see FIG. 6) and a horizontal posture in which the transport handle 50 lies above the top panel 40t of the housing 40 (see FIG. 7). As shown in FIG. 9, the transport handle 50 is formed as a portal frame bent in a U-shape, and a swing axis is located at base end parts 51a of leg parts 51.

Figure 6:
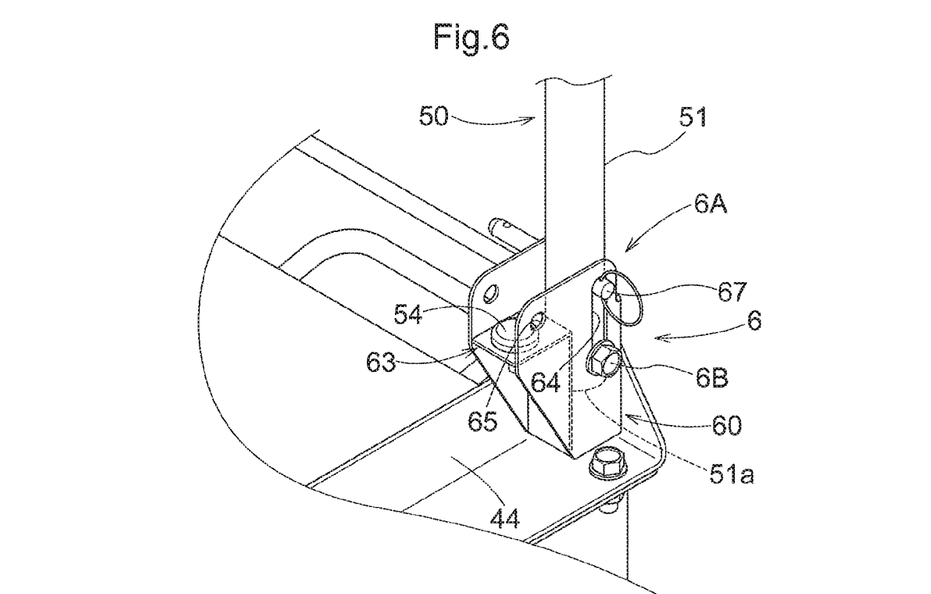
FIG. 6 is a perspective view of a handle assembly in a vertical posture.
Figure 7:
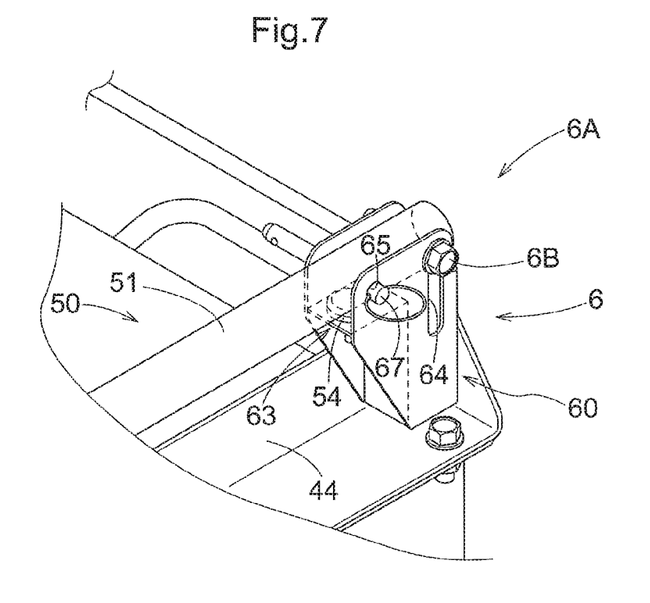
FIG. 7 is a perspective view of the handle assembly in a horizontal posture.
Figure 8:
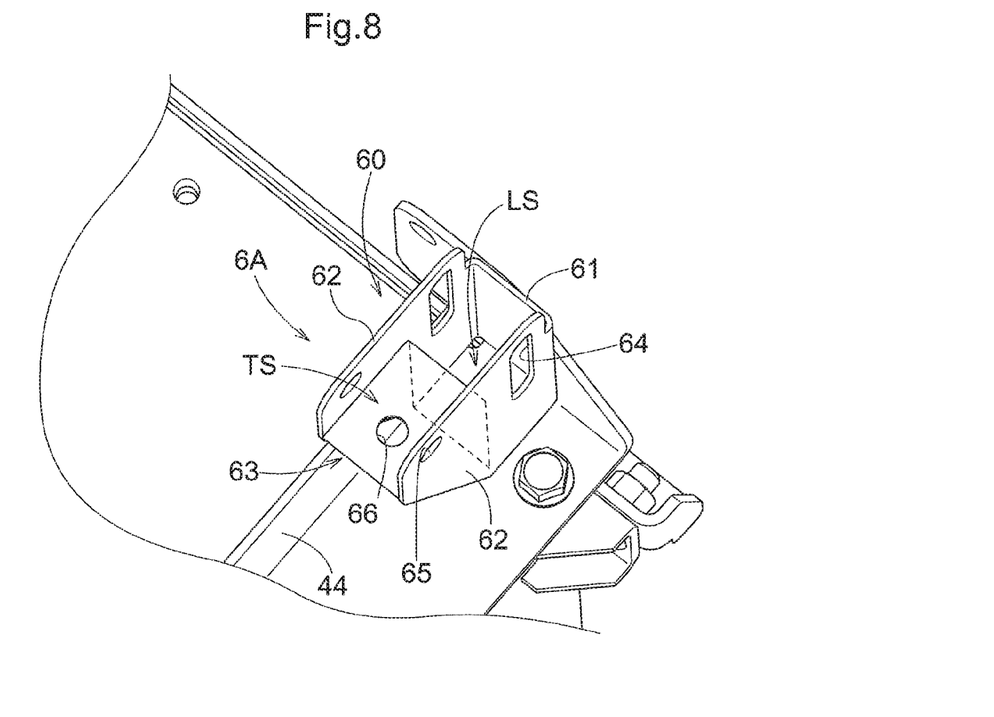
FIG. 8 is a perspective view of a bracket.

As shown in FIGS. 6 and 7, the swing mechanism 6 includes a bracket 6A fixed to the frame 44, and a swing shaft 6B forming the swing axis of the transport handle 50. As shown in FIG. 8, the bracket 6A includes a U-shaped first bracket 60 and an angle-shaped second bracket 63. The first bracket 60 has a first face part 61 and second face parts 62 extending from right and left ends of the first face part 61 toward a side where the front plate 40f is positioned, and is disposed in such a manner that a side end face of the first face part 61 and a side end face of each of the second face parts 62 orient downward. The second bracket 63 is an angle member formed of a horizontal piece and a vertical piece. The second bracket 63 is disposed in such a manner that the horizontal piece of the second bracket 63 extends in a horizontal direction and the vertical piece of the second bracket 63 extends in the vertical direction. The first face part 61 and second face parts 62 of the first bracket 60 and the vertical piece of the second bracket 63 form a vertical socket LS which is a space in a rectangular parallelepiped-shape elongated in a vertical direction. Further, the second face parts 62 of the first bracket 60 and the horizontal piece of the second bracket 63 form a horizontal socket TS which is a space in a rectangular parallelepiped-shape.

Each of the two second face parts 62 of the first bracket 60 is provided with a vertical slot 64 and a lock hole 65, respectively at the same positions between the two second face parts 62. Further, as shown in FIG. 9, each of the base end parts 51a of the leg parts 51 of the transport handle 50 is provided with a first through-hole 52 and a second through-hole 53 at a distance from each other. A bolt which serves as the swing shaft 6B is inserted into both the first through-hole 52 and the vertical slot 64. A detent pin which serves as a lock pin 67 is inserted into the second through-hole 53. An end portion of the detent pin is provided with a ring for facilitating the insertion and removal of the pin. As shown in FIG. 6, in a case where the transport handle 50 is in a vertical posture, the lock pin 67 is inserted into both the vertical slot 64 and the second through-hole 53. As shown in FIG. 7, in a case where the transport handle 50 is in a horizontal posture, the lock pin 67 is inserted into the lock hole 65 and the second through-hole 53. With this configuration, the lock pin 67 functions as a lock mechanism for locking the transport handle 50 in the vertical posture and in the horizontal posture.

As shown in FIG. 6, in a case where the transport handle 50 is in the vertical posture, the base end part 51a of the transport handle 50 is placed in the vertical socket LS with substantially no gap. In this state, the swing shaft 6B is positioned at a lower end of the vertical slot 64, and the lock pin 67 is positioned at an upper end of the vertical slot 64. As the transport handle 50 is operated, a torque is generated around the swing shaft 6B, while the vertical slot 64 acts against the torque around the swing shaft 6B by accepting the base end part 51a of the transport handle 50. In other words, the torque generated in the base end part 51a during the operation of the transport handle 50 is received by the vertical socket LS, i.e., the first face part 61 of the first bracket 60. As shown in FIG. 7, in a case where the transport handle 50 is in the horizontal posture, the base end part 51a of the transport handle 50 is placed in the horizontal socket TS with substantially no gap. In this state, the swing shaft 6B is positioned at the upper end of the vertical slot 64, and the lock pin 67 is inserted into both the lock hole 65 and the second through-hole 53. With this, the transport handle 50 is firmly received by the horizontal socket TS also in the horizontal posture.

The horizontal piece of the second bracket 63 is provided with a vertical hole 66 (see FIG. 8). As shown in FIG. 6, in the vertical hole 66 of the second bracket 63, a mushroom-shaped cushion member 54 is mounted. When the transport handle 50 is swung from the vertical posture to the horizontal posture, the cushion member 54 buffers an impact on the second bracket 63.

Figure 10:
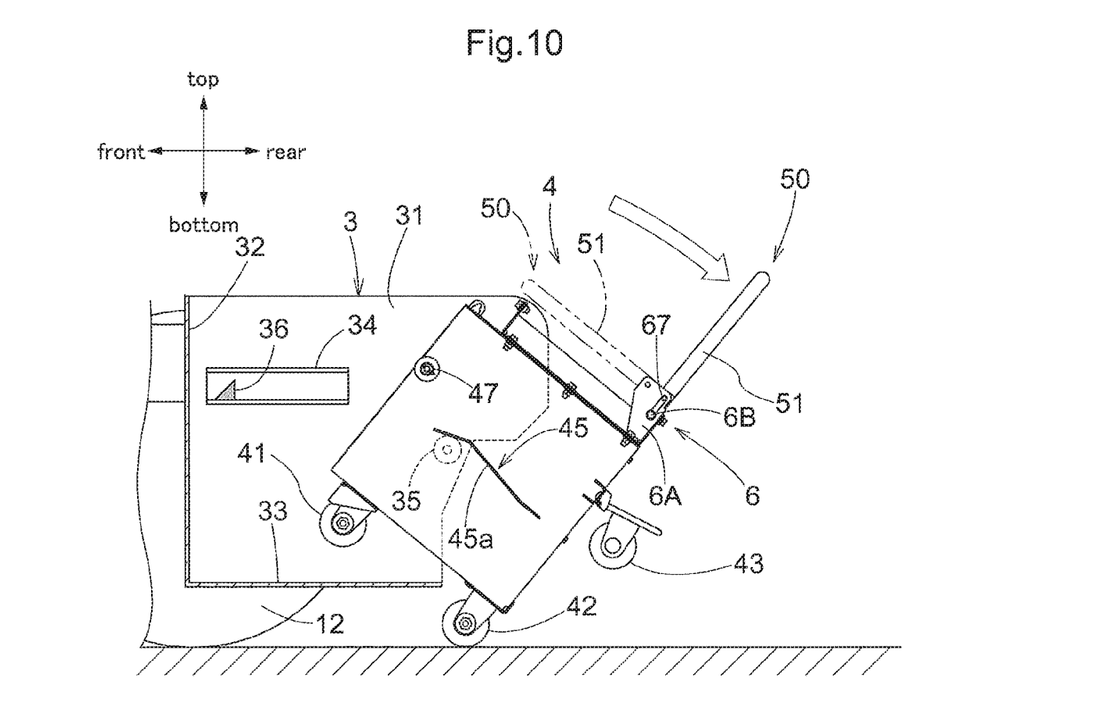
FIG. 10 is a side view showing a process in which the battery pack is installed in the battery housing part.

FIGS. 3 and 10 to 12 show the process of installing the battery pack 4 in the battery housing part 3. FIG. 3 shows a state before the installation, and the battery pack 4 is positioned rearward of the body frame 10. As shown in FIG. 10, when a worker brings the battery pack 4 to the battery housing part 3, the worker moves the battery pack 4 in a tilted state so that the guide plate 45 of the battery pack 4 is placed on the auxiliary roller 35 in the battery housing part 3, and the front wheel 41 is placed above the floor plate 33.

Figure 11:
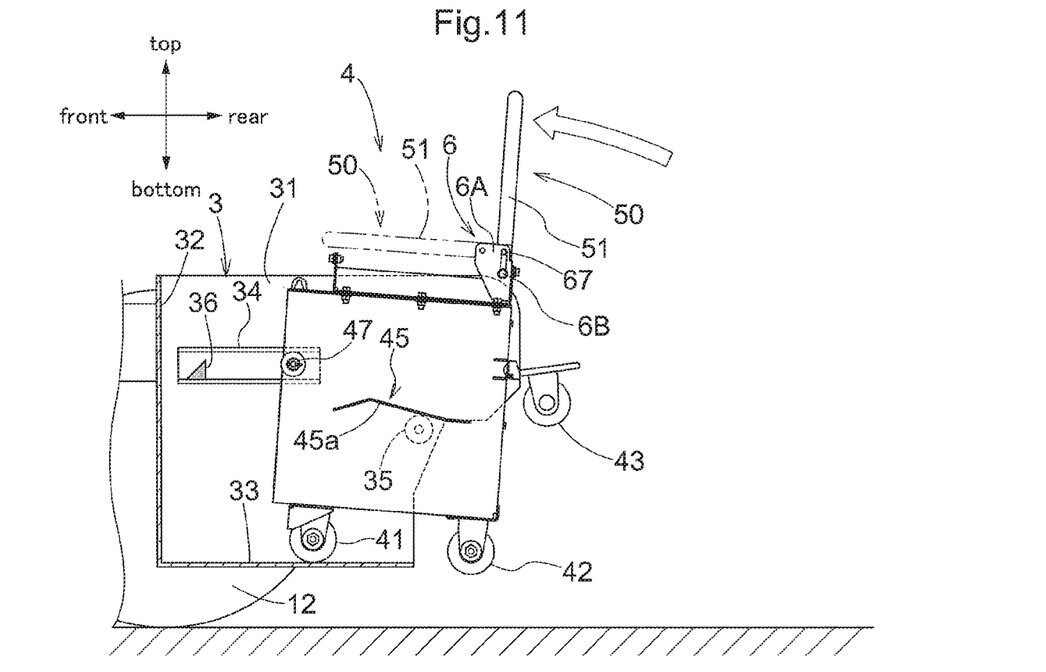
FIG. 11 is a side view showing a process in which the battery pack is installed in the battery housing part.
Figure 12:
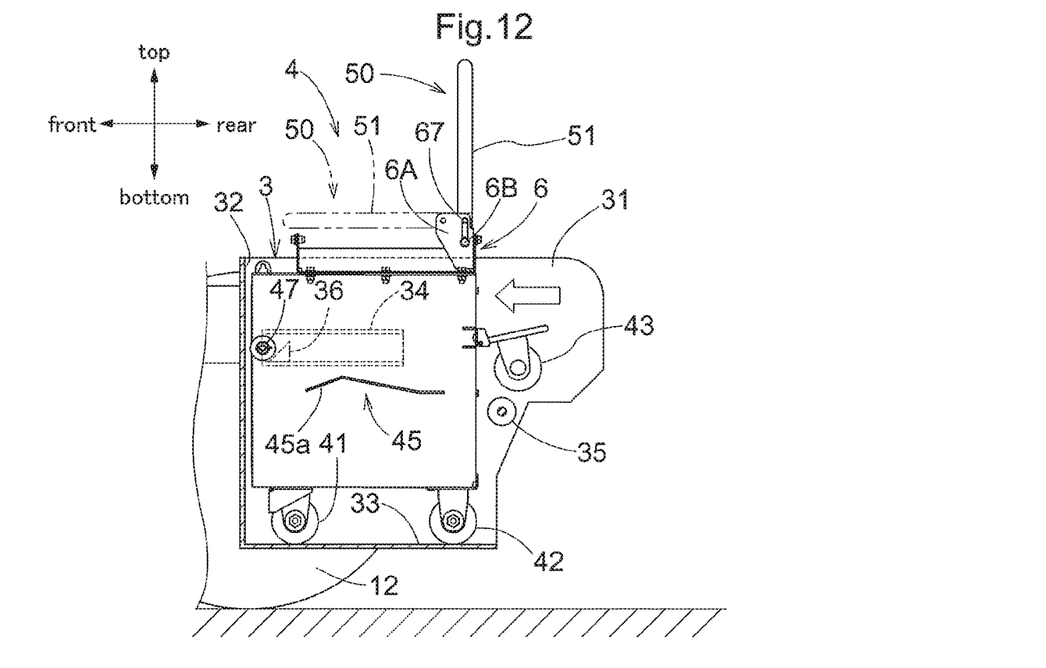
FIG. 12 is a side view showing a state in which the battery pack is installed in the battery housing part.

With reference to FIGS. 10 and 11, the worker moves the battery pack 4 forward while returning the battery pack 4 to the horizontal posture, and make the guide roller 47 of the battery pack 4 enter the guide rail 34 of the battery housing part 3. The battery pack 4 smoothly moves toward a front part of the vehicle body by the rolling support of the guide rail 34 and the guide roller 47, and the guiding of the auxiliary roller 35 and the guide plate 45. Then, as shown in FIG. 12, a movement of the battery pack 4 toward the front side of the vehicle body is restricted by the guide roller 47 coming into contact with the stopper 36. In this state, a connector (not shown) of the battery pack 4 and a connector (not shown) of the battery housing part 3 are brought into connection, and power can be supplied from the battery pack 4 to the running motors 16.

Other Embodiments

The present invention is not limited to the configurations illustrated in the above embodiments. Hereinbelow, other representative embodiments of the present invention will be described.

(1) The shape of the transport handle 50 is not limited to a portal shape, and may be, for example, a T-shape or a hook shape.

(2) The lock mechanism is not limited to those using the lock pin 67, and other lock mechanism may be adopted, such as an elastic holding mechanism in which the handle is elastically held by a plate spring or the like.

(3) The battery housing part 3 may be provided in a front part or middle part of the body frame 10, other than the rear part of the body frame 10.

(4) The above-mentioned electric work vehicle is not limited to the electric mower. The electric work vehicle may be, for example, an electric sanitation vehicle, an electric truck, or the like.

It is noted that the configuration disclosed in the above embodiments (including other embodiments; the same applies hereinafter) can be used in combination with the configuration disclosed in another embodiment, unless it causes inconsistency. In addition, the embodiments disclosed in the present specification are merely examples, and the embodiment of the present invention is not limited to the above and can be suitably modified within the scope that will not deviate from the objective of the present invention.

What is claimed is:

1. A battery pack for an electric work vehicle, the battery pack being installed and removed in and from a battery housing part provided in a vehicle body, the battery pack comprising:
    a box-shaped housing;
    a transport wheel provided to the housing;
    a transport handle;
    a bracket fixed to the housing;
    a swing shaft for swingably connecting the transport handle and the bracket, between a vertical posture in which the transport handle extends upward from the housing and a horizontal posture in which the transport handle lies above the housing;
    a vertical socket for receiving a base end part of the transport handle of the vertical posture to resist a torque of the transport handle caused during an operation; and
    a lock mechanism for locking the transport handle at the verticle posture and at the horizontal posture.

2. The battery pack for the electric work vehicle according to claim 1, further comprising:
    a horizontal socket for receiving the base end part of the transport handle in the horizontal posture.

3. The battery pack for the electric work vehicle according to claim 2, wherein
    the vertical socket and the horizontal socket are integrally formed in the bracket.

4. The battery pack for the electric work vehicle according to claim 2, wherein
    the bracket has a vertical slot formed therein through which the swing shaft penetrates,
    when the transport handle is in the vertical posture, the swing shaft is positioned in a lower portion of the vertical slot, and when the transport handle is in the horizontal posture, the swing shaft is positioned in an upper portion of the vertical slot, and
    the transport handle in the horizontal posture is detached from the vertical socket, and the transport handle in the vertical posture is detached from the horizontal socket.

5. The battery pack for the electric work vehicle according to claim 1, wherein the lock mechanism includes a lock pin that penetrates the transport handle and the bracket.

* * * * *

UNITED STATES PATENT AND TRADEMARK OFFICE
CERTIFICATE OF CORRECTION

PATENT NO. : 11,489,226 B2
APPLICATION NO. : 16/842269
DATED : November 1, 2022
INVENTOR(S) : Masahiro Yamada It is certified that error appears in the above-identified patent and that said Letters Patent is hereby corrected as shown below:

In the Claims

Column 8, Line 5, Claim 1, delete "verticle" and insert -- vertical --

Signed and Sealed this
Third Day of January, 2023

Katherine Kelly Vidal
*Director of the United States Patent and Trademark Office*